United States Patent [19]

Wright

[11] Patent Number: 4,919,580

[45] Date of Patent: Apr. 24, 1990

[54] RECEPTACLE FOR QUICK-RELEASE FASTENER

[76] Inventor: Andrew C. W. Wright, 4a Green Lane, Farnham, Surrey, England

[21] Appl. No.: 359,163

[22] Filed: May 31, 1989

[30] Foreign Application Priority Data

Jun. 17, 1988 [GB] United Kingdom ............... 8814488

[51] Int. Cl.⁵ .......................................... F16B 37/02
[52] U.S. Cl. .................................. 411/173; 411/177; 411/432; 411/523
[58] Field of Search ............... 411/173, 177, 182, 112, 411/108, 432, 523–527

[56] References Cited

U.S. PATENT DOCUMENTS

| | | | |
|---|---|---|---|
| 2,345,053 | 3/1944 | Judd et al. | 411/527 X |
| 2,400,545 | 5/1946 | Kost | 411/527 |
| 2,407,608 | 9/1946 | Judd et al. | 411/527 X |
| 2,560,518 | 7/1951 | Amesbury | 411/523 |
| 3,426,817 | 2/1969 | Parkin et al. | 411/173 |
| 4,333,211 | 6/1982 | Gunther | 411/527 X |

FOREIGN PATENT DOCUMENTS 2311216 12/1976 France ................... 411/112

Primary Examiner—Lloyd A. Gall
Attorney, Agent, or Firm—Kokjer, Kircher, Bradley, Wharton, Bowman & Johnson

[57] ABSTRACT

A two-part front mounted receptacle for a quick-release fastener is disclosed. The receptacle has a body part (10) having a first, substantially planar, front element (11) with an aperture (13) therethrough, and a pair of leg elements (14,18) depending from the ends of the front element (11). A first one (14) of the leg elements has a sprung barb or barbs (15) in use engaging the rear face of the support (30) in which the receptacle is mounted. The receptacle also has a substantially U-shaped spring retainer (20), one side (21) of which is arranged to be engaged and held to each of the legs of the body part and which projects beyond the end of the body part remote from the first leg (14), and the second side (22) of which has a retention mechanism (27,28) for engaging and retaining in use a stud (2) connected therewith. The second side (22) is spaced on the opposite side of the first side (21) from the front element of the body part, and the first side has an aperture (25) aligned with the aperture in the body part and the retention mechanism to allow the stud to pass therethrough.

6 Claims, 1 Drawing Sheet

RECEPTACLE FOR QUICK-RELEASE FASTENER

DESCRIPTION

The present invention relates to a receptacle for a quick-release fastener of the type having a stud and receptacle, one of the stud and receptacle having a cam slot or cam slots cooperating with a cross bar, tab or tabs to provide a locking action as the crossbar or tab moves between first and second positions along the cam slot. Such fasteners are well known, for example, see EP-A-0094150.

BACKGROUND OF THE INVENTION

Fasteners such as that referred to above are usually used to connect a panel or like member to a support member with the stud being held for rotation in an aperture in the panel and the receptacle being held in substantially fixed position in an aperture in the support. Many fasteners of this general type have a receptacle which requires to be fitted from the rear of the support, i.e., on the side opposite the panel, but receptacles have been proposed which can be inserted from the front. Insertion from the front simplifies the assembly process and, in certain cases where there is no access to the rear of the support, may be essential. Usually such front-mounted receptacles comprise either a one-part receptable for simplicity, or comprise multiple parts which may be intended to accommodate thickness variations in the support, for example. However, one part front mounted receptacles, generally tend to be too stiff to be fitted easily and allow very little accommodation of thickness variations. Multiple part devices, whilst overcoming these problems, are generally expensive to manufacture as they usually comprise four or more parts.

SUMMARY OF THE INVENTION

Accordingly, there is a need for a front mounted receptacle to overcome these problems and therefore, in accordance with the present invention there is provided a two-part front mounted receptacle for a quick-release fastener, the receptacle having a body part having a first, substantially planar, front element with an aperture therethrough, and a pair of leg elements depending from the ends of the front element, a first one of the leg elements having a sprung barb or barbs in use engaging the rear face of the support in which the receptacle is mounted; and, a substantially U-shaped spring retainer one side of which is arranged to be engaged and held to each of the legs of the body part and which projects beyond the end of the body part remote from the first leg, and the second side of which has a retention mechanism for engaging and retaining in use a stud connected therewith, the second side being spaced on the opposite side of the first side from the front element of the body part, and the first side having an aperture aligned with the aperture in the body part and the retention mechanism to allow the stud to pass therethrough.

Preferably, the one side of the spring retainer has a transverse slot through which the second leg of the body part passes and the first leg includes an inwards projection providing a shoulder behind which the first side of the spring retainer can be snap-fitted to fix the end of the first side of the clip retainer, the second end being held by the second leg of the body part engaging through the slot.

The second leg of the body part preferably includes a transversely extending flange portion which, together with the portion projecting through the slot in the spring retainer, is narrower than the main part of the front element of the body part.

Advantageously, the first leg of the body part has a generally curved shape in the direction extending away from the front element whereby the receptacle can be inserted in an aperture by inserting the projecting end portion of the spring retainer through an aperture in the support and pushing the receptacle into the aperture so as to deflect the first leg until the barb or barbs snap-fit behind the support with the front element engaging the front of the support and retaining the receptacle thereon. Advantageously, the front element of the body part has a pair of sideways extending protrusions to engage the front of the support.

The retention mechanism on the spring retainer preferably comprises an aperture having a pair of inwardly directed tabs for engagement with a cam slot in a stud, but an alternative configuration comprises a tubular projection in which a pair of cam-slots are formed for engagement with the cross bar of a stud.

One example of a receptacle constructed in accordance with the present invention will now be described with reference to the accompanying drawings in which:

DESCRIPTION OF THE PREFERRED EMBODIMENTS

Figure 1:
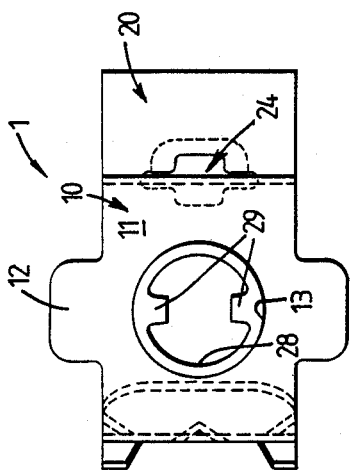
FIG. 1 is a plan view of the receptacle.
Figure 4:
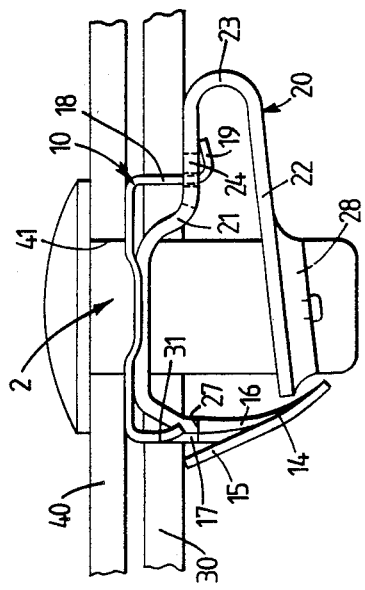
FIG. 4 is a side view of a fastener incorporating such a receptacle.
Figure 3:
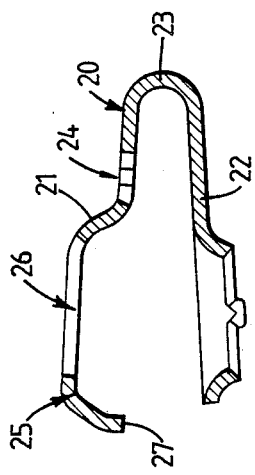
FIG. 3 is a side view of the spring retainer of the receptacle.
Figure 2:
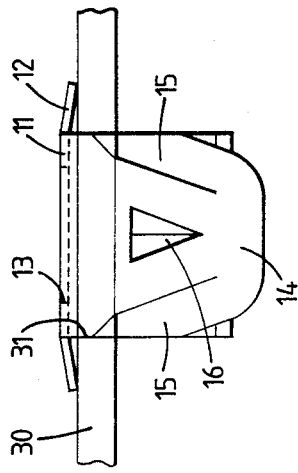
FIG. 2 is an end view of the receptacle shown in position on a support.

The receptacle 1 comprises first and second parts 10,20 formed of spring steel. The receptacle is shown in FIGS. 2 and 4 mounted in an aperture 31 of a support 30 and FIG. 4 shows a cooperating stud 2 mounted in an aperture 41 of a panel 40 attached to the support 30 by the fastener constituted by the stud and receptacle.

The first part 10 of the receptacle comprises a body part 10 having a substantially planar front element or main part 11 with a pair of sideways projecting tabs 12 and a central circular aperture 13. As seen in FIG. 2, the tabs are slightly inlined to the plane of the front element 11. Depending from one end of the front element 11 is a first leg 14 which is substantially curved in the direction extending away from the front element 11 and which includes a pair of barbs 15 of generally elongate triangular shape, formed on either side of the leg 14. The leg 14 also includes an inwardly projecting dimple 16 above which is formed an aperture 17, the dimple 16 providing a shoulder facing towards the underside of the front element 11.

The second part comprises a generally U-shaped spring retainer 20 having first and second sides 21,22 and a bight portion 23. The first side 21 has a transverse slot 24, positioned in a first planar portion, through which extends a reduced width portion of a second leg 18 of the body part, the leg 18 having a sideways extending flange 19 which engages the underside of the first side 21 of the spring retainer.

The side 21 has a raised portion 25 which also has a circular aperture 26 aligned with the aperture 13 in the front element 11 and a free end 27 which is a snap-fit against the shoulder formed by the dimple 16. The distance between the end 27 and the adjacent end of the slot 24 is arranged to be slightly greater than the distance between the leg 18 and the leg 14 at the level just above the shoulder 16, so that the first side is a snap-fit in the body part and is retained without lengthwise movement.

The second side 22 of the spring retainer has an aperture 28 with a pair of radially inwardly directed tabs 29 for engagement with respective cam slots on the stud 2 which, together with the receptacle 1, constitutes a quick-release fastener.

In use, the receptacle is fitted at a rectangular aperture 31 in a support, by presenting the receptacle to the aperture at an angle and inserting the bight portion or projecting end portion through the aperture and then pushing the receptacle into the aperture until the barbs 15 snap behind the support at the other end, whereby the receptacle is then held between the tabs or protrusions 12 on the front of the support and the barb 15 and bight portion 23 on the other side of the support.

What is claimed is:

1. A two-part front mounted receptacle for a quick-release fastener including a stud, said receptacle being mountable in a support provided with an aperture and having a front and a back;

said receptacle having a body part having a first, substantially planar, front element, said front element having first and second ends and being formed with an aperture therethrough, said body part having a leg element depending from each of said ends of said front element, a first one of said leg elements having at least one sprung barb for engaging a rear face of said aperture in said support; and, a substantially U-shaped spring retainer having first and second sides, each of which has first and second ends, said first side being arranged to be engaged and held to each of said leg elements of said body part and projecting beyond an end of said body part remote from said first leg element, said second side having a retention mechanism for engaging and retaining in use said stud connected therewith, said second side being spaced on an opposite side of said first side from said front element of said body part, and said first side having an aperture aligned with said aperture in said body part and said retention mechanism to allow said stud to pass therethrough.

2. A receptacle in accordance with claim 1, wherein said first side of said spring retainer is provided with a transverse slot through which said second leg of said body part passes, and said first leg of said body part includes an inward projection, said inward projection providing a shoulder behind which said first side of said spring retainer can be snap-fitted to fix said first end of said side of said spring retainer, said second end of said first side being held by said second leg of said body part engaging through said slot.

3. A receptacle in accordance with claim 1, wherein said second leg of said body part includes a transversely extending flange portion and a portion which projects through a slot in said spring retainer; said flange portion and said portion projecting through said slot in said spring retainer being narrower than a main part of said front element of said body part.

4. A receptacle in accordance with claim 1, wherein said first leg of the body part has a generally curved shape in a direction extending away from said front element whereby said receptacle can be inserted in said aperture in said support by inserting a projecting end portion of said spring retainer through said aperture in said support and pushing said receptacle into said aperture so as to deflect said first leg until said at least one barb snap-fits behind said support with said front element engaging the front of the support and retaining the receptacle thereon.

5. A receptacle in accordance with claim 1, wherein said front element of the body part has a pair of sideways extending protrusions to engage said front of said support.

6. A receptacle in accordance with claim 1, wherein said retention mechanism on said spring retainer comprises an aperture having a pair of inwardly directed tabs for engagement with a cam slot in said stud.

* * * * *